US012799344B2

(12) United States Patent
Misawa et al.

(10) Patent No.: US 12,799,344 B2
(45) Date of Patent: Nov. 17, 2026

(54) RECORDING INK, INK SET, INK MEDIA SET, AND PRINTING MEDIA

(71) Applicant: Nippon Kayaku Kabushiki Kaisha, Tokyo (JP)

(72) Inventors: Shunta Misawa, Tokyo (JP); Aiko Matsumura, Tokyo (JP); Yuki Kaji, Tokyo (JP); Keishiro Yoshida, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 526 days.

(21) Appl. No.: 18/553,837

(22) PCT Filed: Mar. 30, 2022

(86) PCT No.: PCT/JP2022/016360

§ 371 (c)(1),
(2) Date: Oct. 3, 2023

(87) PCT Pub. No.: WO2022/224789

PCT Pub. Date: Oct. 27, 2022

(65) Prior Publication Data

US 2024/0218197 A1 Jul. 4, 2024

(30) Foreign Application Priority Data

Apr. 19, 2021 (JP) ................................ 2021-070174
Apr. 20, 2021 (JP) ................................ 2021-071374

(51) Int. Cl.
*C09D 11/38* (2014.01)
*C09D 11/322* (2014.01)
*C09D 11/40* (2014.01)

(52) U.S. Cl.
CPC ............ *C09D 11/38* (2013.01); *C09D 11/322* (2013.01); *C09D 11/40* (2013.01)

(58) Field of Classification Search
CPC ........ C09D 11/38; C09D 11/322; C09D 11/40
See application file for complete search history.

(56) References Cited

U.S. PATENT DOCUMENTS 5,748,208 A * 5/1998 Uchiyama ................ B41M 1/18 347/100
8,435,339 B2 5/2013 Koyano et al.
2006/0047013 A1* 3/2006 Ito ........................ C09D 11/326 523/160
2008/0229972 A1* 9/2008 Blease .................. C09D 11/38 347/100
2010/0196602 A1 8/2010 Koyano et al.
2015/0275014 A1* 10/2015 Yamazaki ............ C09D 11/322 347/20
2019/0275818 A1 9/2019 Watanabe et al.

FOREIGN PATENT DOCUMENTS

| | | | |
|---|---|---|---|
| CN | 101784621 | A | 7/2010 |
| EP | 2467262 | B1 | 9/2015 |
| EP | 2178993 | B1 | 6/2018 |
| JP | 2008-260926 | A | 10/2008 |
| JP | 2010-222418 | A | 10/2010 |
| JP | 2013-064079 | A | 4/2013 |
| JP | 2014-058626 | A | 4/2014 |
| JP | 5817027 | B2 | 11/2015 |
| JP | 5928027 | B2 | 6/2016 |
| JP | 5928028 | B2 | 6/2016 |
| JP | 2017-078114 | A | 4/2017 |
| JP | 2017-078115 | A | 4/2017 |
| JP | 2017-105908 | A | 6/2017 |
| JP | 6376505 | B2 | 8/2018 |
| JP | 2020066653 | A * | 4/2020 |
| JP | 2020-105476 | A | 7/2020 |
| WO | WO 2009/116197 | A1 | 9/2009 |
| WO | WO 2011/013503 | A1 | 2/2011 |
| WO | WO 2011/021591 | A1 | 2/2011 |

OTHER PUBLICATIONS

English machine translation of JP-2020066653-A (Year: 2020).*
Notice of Reasons for Rejection issued in Japanese Patent Application No. 2022-562126, mailed Dec. 13, 2022.
Extended Search Report issued in European Patent Application No. 22791564.2, dated Feb. 28, 2025, in 7 pages.
Office Action issued in Chinese Patent Application No. 202280027950.6, Mar. 27, 2025, in 12 pages.

* cited by examiner

*Primary Examiner* — Jennifer A Smith
*Assistant Examiner* — Jeffrey Eugene Barzach
(74) *Attorney, Agent, or Firm* — Knobbe, Martens, Olson & Bear, LLP

(57) ABSTRACT

A recording ink comprising a coloring material, a first surfactant, a second surfactant, and water. The first surfactant includes a surfactant among polyoxyethylene β-naphthyl ether, a dioctyl sulfosuccinic acid ester salt, and the like; and the second surfactant includes a surfactant among an alkylene oxide adduct of 2,4,7,9-tetramethyl-5-decyne-4,7-diol, polyoxyalkylene alkyl ether, and the like. An ink set and an ink media set which include the recording ink, and printing media to which the recording ink adheres.

7 Claims, No Drawings

RECORDING INK, INK SET, INK MEDIA SET, AND PRINTING MEDIA

This application is the U.S. National Phase under 35 U.S.C. § 371 of International Application PCT/JP2022/016360, filed Mar. 30, 2022, designating the U.S., and published in Japanese as WO 2022/224789 on Oct. 27, 2022, which claims priority to Japanese Patent Application No. 2021-070174, filed Apr. 19, 2021; and Japanese Patent Application No. 2021-071374, filed Apr. 20, 2121, the entire contents of which are incorporated herein by reference.

TECHNICAL FIELD

The present invention relates to a recording ink, an ink set, an ink and medium set, and a printed medium.

BACKGROUND ART

A printing method with an inkjet printer (inkjet printing method), which is one of the most representative color printing methods, involves generating small droplets of ink and adhering them to a printing medium such as paper to perform printing. In recent years, increasing demand for industrial applications has driven demand for methods that support various printing media.

Among the printing media used for industrial applications, there is also a non-ink-absorbent medium represented by a film. In order to print on such a non-ink-absorbent medium, a solvent ink using an organic solvent as the main solvent, a curable ink containing a polymerizable monomer, and the like have been developed. However, these inks have many safety issues for the natural environment, living organisms, and the like, and their applications have been limited. Therefore, a growing trend in recent years has been for development of a water-based ink using water as the main solvent in consideration of environmental and working aspects.

Since the wetting and spreading of ink is worse on a non-ink-absorbent medium than on an ink-absorbent medium, the dot diameter of the ink generally tends to be smaller. To ensure wettability to the non-ink-absorbent medium, the surface tension of the ink must be equivalent to or lower than the surface tension of the substrate. For this reason, a surfactant that has the effect of lowering surface tension is often added to an ink, and in particular, a silicone surfactant is often added thereto (see, for example, Patent Documents 1 to 4).

In industrial applications, a printing medium is sometimes post-processed by laminating and overcoating, and thus a property of being applied onto an ink film (recoatability) is also important. If the ink has poor recoatability, the material for post-processing may be repelled, causing poor post-processing performance. In addition, poor ink recoatability may decrease resolution of an image depending on the printing method. For example, when an inkjet printer in which an inter-color heater is mounted for each color is used to perform printing, there is a possibility that ink is repelled on the previously printed ink film, resulting in decreased resolution of an image, when printing a second or subsequent color.

In view of such problems, there is a strong demand for an ink with excellent wettability to and recoatability on the non-ink-absorbent medium.

CITATION LIST

Patent Document

Patent Document 1: Japanese Patent No. 5928027
Patent Document 2: Japanese Patent No. 5928028
Patent Document 3: Japanese Patent No. 5817027
Patent Document 4: Japanese Patent No. 6376505

Disclosure of the Invention

Problems to be Solved by the Invention

An object of the present invention is to provide: a recording ink with good wettability to a non-ink-absorbent medium and also excellent recoatability; an ink set including the recording ink; an ink and medium set including the recording ink or the ink set and a printing medium; and a printed medium to which the recording ink or each recording ink included in the ink set adheres.

Means for Solving the Problems

Specific means for achieving the above object includes embodiments described below.

1) A recording ink containing a coloring material, a first surfactant, a second surfactant, and water, in which: the first surfactant contains at least one compound selected from the group consisting of a compound represented by formula (a) below, a compound represented by formula (b) below, and a compound represented by formula (c) below, provided that when containing the compound represented by formula (c) below, the first surfactant further contains at least one compound selected from the compound represented by formula (a) below and the compound represented by formula (b) below; and the second surfactant contains at least one compound selected from a compound represented by formula (d) below and a compound represented by general formula (e) below:

(a)

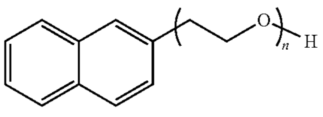

(b)

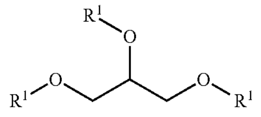

(c)

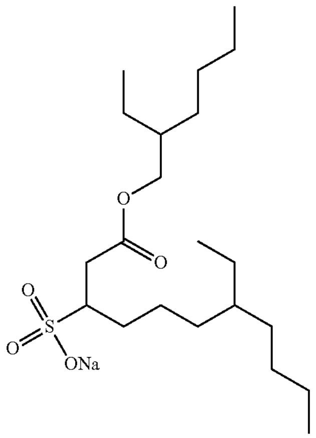

-continued (d)

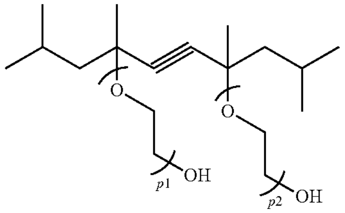

(e)

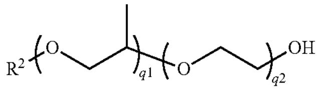

$R^1$ =

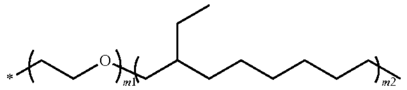

in formula (a), n represents an integer of 3 to 25, in formula (b), $m^1$ represents an integer of 1 to 4, and $m^2$ represents an integer of 0 to 3,

*in $R^1$ represents the position of bonding to an oxygen atom in formula (b), in formula (d), $p^1$ represents an integer of 0 to 4, $p^2$ represents an integer of 0 to 4, and the sum of $p^1$ and $p^2$ is 1 to 4, and in formula (e), $q^1$ represents an integer of 0 to 4, $q^2$ represents an integer of 1 to 5, and $R^2$ represents a linear or branched C10-C13 hydrocarbon group.

2) The recording ink according to 1), in which the second surfactant contains a compound having an ethyleneoxy group in an amount of 1 to 5 molar equivalents and a propyleneoxy group in an amount of 0 to 3 molar equivalents per mole of molecules.

3) The recording ink according to 1) or 2), in which the coloring material is a pigment, and a content thereof is 1 to 10% by mass.

4) The recording ink according to any one of 1) to 3), in which a content of the water is 80% by mass or more.

5) An ink set including: the recording ink according to any one of 1) to 4); and an additional recording ink different from the recording ink.

6) An ink and medium set including: the recording ink according to any one of 1) to 4) or the ink set according to 5); and a printing medium.

7) A printed medium to which the recording ink according to any one of 1) to 4) or each recording ink included in the ink set according to 5) adheres.

Effects of the Invention

The present invention can provide: a recording ink with good wettability to a non-ink-absorbent medium and also excellent recoatability; an ink set including the recording ink; an ink and medium set including the recording ink or the ink set and a printing medium; and a printed medium to which the recording ink or each recording ink included in the ink set adheres.

Preferred Mode for Carrying Out the Invention

Hereinafter, specific embodiments to which the present invention is applied will be described in detail. As used herein, "C. I." means a "color index". As used herein, the terms "alkylene", "propylene", and "alkyl" are used in a sense that encompasses both linear and branched structures, unless otherwise specified.

<Recording Ink>

A recording ink (hereinafter, also simply referred to as an "ink") according to the present embodiment contains a coloring material, a first surfactant, a second surfactant, and water. Hereinafter, components contained in the ink according to the present embodiment will be described in detail. Note that each of the components described below may be used alone or in combinations of two or more thereof.

[Coloring Material]

The coloring material to be used can be a known coloring agent such as a pigment, a disperse dye, and a solvent dye. Among them, the coloring agent preferably includes a pigment.

Examples of the pigment include an inorganic pigment, an organic pigment, an extender pigment, and a hollow particle.

Examples of the inorganic pigment include carbon black, a metal oxide, a metal hydroxide, a metal sulfide, a metal ferrocyanide, and a metal chloride.

When the ink according to the present embodiment is a black ink, and the coloring material is an inorganic pigment, the inorganic pigment contained in the black ink is preferably carbon black such as thermal black, acetylene black, oil furnace black, gas furnace black, lamp black, gas black, and channel black. Specific examples of the carbon black include the Raven series, manufactured by Columbia Carbon; the Monarch series, Regal series, and Mogul series, manufactured by Cabot Corporation; the Color Black series, Printex series, Special Black series, and Nerox series, manufactured by Orion Engineered Carbons; and the MA series, MCF series, No. 25, No. 33, No. 40, No. 47, No. 52, No. 900, and No. 2300, manufactured by Mitsubishi Chemical Corporation.

When the ink according to the present embodiment is a white ink, and the coloring material is an inorganic pigment, examples of the inorganic pigment contained in the white ink include: an oxide, nitride, or oxynitride of a metal such as zinc, silicon, aluminum, titanium, strontium, and zirconium; and an inorganic compound such as glass and silica. Among them, titanium dioxide and zinc oxide are preferred.

Examples of the organic pigment include various pigments such as azo, disazo, phthalocyanine, quinacridone, isoindolinone, dioxazine, perylene, perinone, thioindigo, anthraquinone, and quinophthalone. Among them, a disazo pigment is preferred.

Specific examples of the organic pigment include yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199, 202, and 213; red pigments such as C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264, 269, and 272; blue pigments such as C.I. Pigment Blue 1, 2, 3, 15, 15:1, 15:2, 15:3, 15:4, 15:6, 16, 22, 25, 60, 66, and 80; violet pigments such as C.I. Pigment Violet 19, 23, 29, 37, 38, and 50; orange pigments such as C.I. Pigment Orange 13, 16, 43, 68, 69, 71, and 73; green pigments such as C.I. Pigment Green 7, 36, and 54; and black pigments such as C.I. Pigment Black 1. Among them, C.I. Pigment Blue 15:4 is preferred.

Examples of the extender pigment include silica, calcium carbonate, talc, clay, barium sulfate, and white carbon. The extender pigment is often used in combination with other coloring agents.

The hollow particle available can be a known hollow particle described in, for example, U.S. Pat. No. 4,880,465, Japanese Patent No. 3562754, Japanese Patent No. 6026234, Japanese Patent No. 5459460, Japanese Unexamined Patent Application, Publication No. 2003-268694, and Japanese Patent No. 4902216, and in particular, is preferably used as a white pigment.

The disperse dye is preferably, for example, a dye selected from C.I. Disperse. Specific examples thereof include yellow dyes such as C.I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; red dyes such as C.I. Disperse Red 60, 73, 88, 91, 92, 111, 127, 131, 143, 145, 146, 152, 153, 154, 167, 179, 191, 192, 206, 221, 258, and 283; orange dyes such as C.I. Disperse Orange 9, 25, 29, 30, 31, 32, 37, 38, 42, 44, 45, 53, 54, 55, 56, 61, 71, 73, 76, 80, 96, and 97; violet dyes such as C.I. Disperse Violet 25, 27, 28, 54, 57, 60, 73, 77, 79, and 79:1; and blue dyes such as C.I. Disperse Blue 27, 56, 60, 79:1, 87, 143, 165, 165:1, 165:2, 181, 185, 197, 202, 225, 257, 266, 267, 281, 341, 353, 354, 358, 364, 365, and 368.

The solvent dye is preferably, for example, a dye selected from C.I. Solvent.

The average particle size of the coloring material is preferably 30 to 300 nm and more preferably 50 to 250 nm. The average particle size as used herein refers to an average particle size of particles as measured using laser light scattering.

The content of the coloring material with respect to the total mass of the ink according to the present embodiment is preferably 1 to 30% by mass, more preferably 1 to 10% by mass, and even more preferably 2 to 8% by mass.

[First Surfactant and Second Surfactant]

The first surfactant contains at least one compound selected from the group consisting of a compound represented by formula (a) below, a compound represented by formula (b) below, and a compound represented by formula (c) below, provided that when containing the compound represented by formula (c), the first surfactant further contains at least one compound selected from the group consisting of the compound represented by formula (a) and the compound represented by formula (b). The second surfactant contains at least one compound selected from a compound represented by formula (d) below and a compound represented by general formula (e) below.

(a)

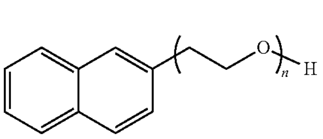

(b)

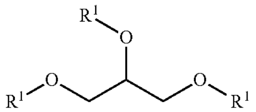

-continued (c)

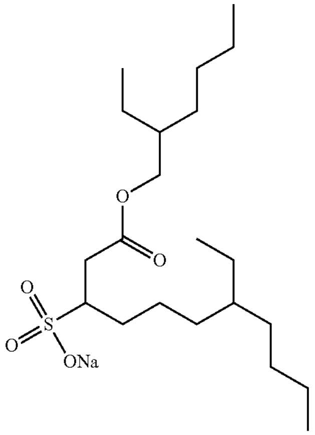

(d)

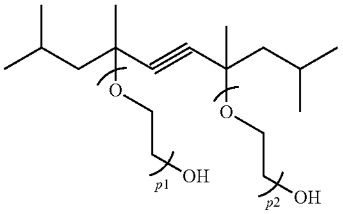

(e)

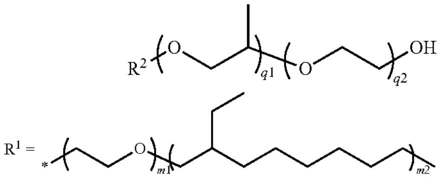

In formula (a), n represents an integer of 3 to 25, and preferably an integer of 3 to 10, and is more preferably 3. Examples of the compound represented by formula (a) include BLAUNON BN series (manufactured by AOKI OIL INDUSTRIAL CO., Ltd,), among which BLAUNON BN-3, BLAUNON BN-10, and BLAUNON BN-25 are preferred; BLAUNON BN-3 and BLAUNON BN-10 are more preferred; and BLAUNON BN-3 is even more preferred.

In formula (b), $m^1$ represents an integer of 1 to 4, and $m^2$ represents an integer of 0 to 3. All three $R^1$'s in formula (b) may be the same, all three may be different, or two of the three may be the same while the remaining one may be different. * in $R^1$ represents the position of bonding to an oxygen atom in formula (b). Examples of the compound represented by formula (b) include Hydropalat series (manufactured by BASF SE), among which Hydropalat WE3323 is preferred.

Examples of the compound represented by formula (c) include ADEKA COL EC-8600 (manufactured by ADEKA Corporation).

In formula (d), $p^1$ represents an integer of 0 to 4, and preferably an integer of 0 to 2. In addition, $p^2$ represents an integer of 0 to 4, and preferably an integer of 0 to 2. However, the sum of $p^1$ and $p^2$ is 1 to 4. Examples of the compound represented by formula (d) include SURFYNOL 400 series (manufactured by Nissin Chemical Industry Co., Ltd.), among which SURFYNOL 420 and SURFYNOL 440 are preferred.

In formula (e), $q^1$ represents an integer of 0 to 4, and preferably an integer of 0 to 3. In addition, $q^2$ represents an integer of 1 to 5, and preferably an integer of 3 to 5. $R^2$ represents a linear or branched C10-C13 hydrocarbon group, and preferably a branched C10-C13 hydrocarbon group. Examples of the compound represented by formula (e) include Lutensol XP series (manufactured by BASF SE); and SOFTANOL 30 and SOFTANOL 50 (all manufactured by Nippon Shokubai Co., Ltd.). Lutensol XP30, Lutensol XP40, Lutensol XP50, SOFTANOL 30, and SOFTANOL 50 are preferred; and Lutensol XP40, SOFTANOL 30, and SOFTANOL 50 are more preferred.

Among the first surfactant described above, BLAUNON BN-3, Hydropalat WE3323, and ADEKA COL EC-8600 are preferred. The first surfactant preferably contains two or more thereof. When the first surfactant contains two or more thereof, a combination of at least one of BLAUNON BN-3 and Hydropalat WE3323 with ADEKA COL EC-8600 is preferred, and a combination of BLAUNON BN-3 or Hydropalat WE3323 with ADEKA COL EC-8600 are more preferred.

Among the second surfactant described above, SURFYNOL 420, SURFYNOL 440, Lutensol XP40, SOFTANOL 30, and SOFTANOL 50 are preferred.

The second surfactant preferably contains a compound having an ethyleneoxy group in an amount of 1 to 5 molar equivalents and a propyleneoxy group in an amount of 0 to 3 molar equivalents per mole of molecules. Herein, the ethyleneoxy group in an amount of 1 to 5 molar equivalents means that one molecule of the surfactant includes 1 to 5 repeating oxygen-ethylene units. In addition, the propyleneoxy group in an amount of 0 to 3 molar equivalents means that one molecule of the surfactant includes no or 1 to 3 repeating oxygen-propylene units.

Both the first surfactant and the second surfactant have a function of lowering the surface tension or interfacial tension of a liquid (surface-active ability). However, when mixed with a material such as a resin having a hydrophobic group, a carboxy group, a hydroxy group, or the like, the surfactants may be adsorbed onto the resin or the like due to hydrogen bond, hydrophobic interaction, or the like, and thus the surfactants may not exhibit the surface-active ability. For this reason, when only one of the first surfactant and the second surfactant is added, the surfactant may not be oriented sufficiently and prevents ink from wetting onto the printing medium, resulting in color unevenness thereon. Therefore, both the first surfactant and the second surfactant are added in the ink according to the present embodiment. In particular, the water-based ink has a composition in which the ratio of water is large, the reaction thermodynamically proceeds in a direction in which entropy increases. Therefore, when water is added to a hydrophobic material, the reaction proceeds in the direction in which the entropy of water increases (i.e., hydrophobic molecules aggregate). For this reason, the first surfactant has a structure with more hydrophobic groups than the second surfactant. On the other hand, the first surfactant has a structure with many hydrophobic groups, making it less water soluble, and thus cannot be added in a large amount to the water-based ink. Therefore, the first surfactant is added in expectation of an adsorption effect to a material such as a resin, and the second surfactant is further added in expectation of an effect of imparting sufficient wettability to a printing medium, whereby the ink may have both of these effects.

The content of the first surfactant with respect to the total mass of the ink according to the present embodiment is preferably 0.05 to 10% by mass, more preferably 0.1 to 5% by mass, even more preferably 0.3 to 2.5% by mass, and particularly preferably 0.3 to 1.5% by mass. The content of the second surfactant with respect to the total mass of the ink according to the present embodiment is preferably 0.05 to 10% by mass, more preferably 0.1 to 5% by mass, even more preferably 0.3 to 2.5% by mass, and particularly preferably 0.5 to 1.5% by mass.

The value of (S1)/(S2) is preferably 0.1 to 2.0, more preferably 0.25 to 1.5, and even more preferably 0.4 to 1.0, where (S1) represents the total mass of the first surfactant contained in the ink according to the present embodiment, and (S2) represents the total mass of the second surfactant. In addition, the relationship of (S1)<(S2) is preferably satisfied.

[Water]

The water is preferably water with a small contained amount of impurities such as metal ions, i.e., ion-exchanged water, distilled water, or the like.

The content of the water with respect to the total mass of the ink according to the present embodiment is preferably 80% by mass or more.

[Dispersant]

The ink according to the present embodiment may contain a dispersant. Examples of the dispersant include a copolymer composed of at least two monomers (preferably at least one of which is a hydrophilic monomer) selected from monomers such as styrene and a derivative thereof; vinylnaphthalene and a derivative thereof; an aliphatic alcohol ester of a, β-ethylene unsaturated carboxylic acids; (meth)acrylic acid and a derivative thereof; maleic acid and a derivative thereof; itaconic acid and a derivative thereof; fumaric acid and a derivative thereof; and vinyl acetate, vinyl alcohol, vinyl pyrrolidone, or acrylamide and a derivative thereof. The hydrophilic monomer includes a monomer in which a carboxyl group remains after polymerization, such as acrylic acid and methacrylic acid.

Examples of the copolymer include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth) acrylic acid copolymer, and a styrene-maleic acid copolymer. Among them, a styrene-(meth)acrylic acid copolymer, a styrene-(meth)acrylic acid-(meth)acrylic acid ester copolymer, a (meth)acrylic acid ester-(meth)acrylic acid copolymer, and a polyethylene glycol (meth)acrylate-(meth) acrylic acid copolymer are preferred; a styrene-(meth)acrylic acid copolymer, a styrene-(meth)acrylic acid-(meth)acrylic acid ester copolymer, and a (meth)acrylic acid ester-(meth)acrylic acid copolymer are more preferred; a (meth)acrylic acid ester-(meth)acrylic acid copolymer are even more preferred; and a methacrylic acid ester-methacrylic acid copolymer is particularly preferred. Examples of the copolymer include a block copolymer, a random copolymer, and a graft copolymer. The copolymer may be in the form of a salt.

As used herein, the term "(meth)acrylic" is used in a sense that includes both "acrylic" and "methacrylic". The same applies to "(meth)acrylate" and the like.

The dispersant can be synthesized or obtained as a commercially product.

Examples of the dispersant obtained by synthesis include an A-B block polymer disclosed in International Publication No. WO 2013/115071. The monomer constituting an A block of the A-B block polymer disclosed in International Publication No. WO 2013/115071 is at least one monomer selected from (meth)acrylic acid and linear or branched C4 alkyl (meth)acrylate, preferably at least one monomer selected from methacrylic acid and n-butyl methacrylate, and more preferably a combination of these two monomers. In addition, the monomer constituting a B block of the A-B block polymer disclosed in International Publication No. WO 2013/115071 is at least one monomer selected from benzyl methacrylate and benzyl acrylate, preferably benzyl methacrylate. Specific examples of the A-B block polymer include block copolymers disclosed in Synthesis Examples 3 to 8 of International Publication No. WO 2013/115071.

Examples of the commercially available dispersant include Joncyrl 62, 67, 68, 678, or 687 (styrene-acrylic copolymer manufactured by BASF SE); ARON AC-10SL (polyacrylic acid manufactured by Toagosei Co., Ltd.); and BYKJET 9151, 9152, 9170, or 9171 (wet dispersant manufactured by BYK).

The mass average molecular weight (MW) of the dispersant is preferably 3000 to 50000, and more preferably 7000 to 25000. The mass average molecular weight of the dispersant can be measured by gel permeation chromatography (GPC). Specifically, the measurement can be performed by using HLC-8320 GPC (manufactured by Tosoh Corporation) as a GPC device, two TSK gel Super MultIpore HZ-H (manufactured by Tosoh Corporation, inner diameter of 4.6 mm×15 cm) as columns, tetrahydrofuran as an eluent, and TSK Standard (manufactured by Tosoh Corporation) as a standard sample.

The acid value of the dispersant is preferably 50 to 300 mg KOH/g, more preferably 80 to 275 mg KOH/g, and even more preferably 80 to 250 mg KOH/g.

The dispersant can be used in a state of mixture with a coloring material. In addition, the coloring material may be used in a state where part or all of the surface thereof is covered with the dispersant. Alternatively, both of these states may be used together.

When the ink according to the present embodiment contains the dispersant, a ratio of the total mass of the dispersant to the total mass of the coloring material is preferably 0.01 to 1.0, more preferably 0.05 to 0.6, and even more preferably 0.1 to 0.5.

[Fixing Resin]

The ink according to the present embodiment may contain a fixing resin. When the ink according to the present embodiment contains the fixing resin, an image printed on a printing medium tends to have improved fastness, such as water resistance, abrasion resistance, and alcohol resistance. The fixing resin is preferably at least one selected from a polymer and a wax.

Examples of the polymer include a urethane polymer, a polyester polymer, an acrylic polymer, a vinyl acetate polymer, a vinyl chloride polymer, a styrene-acrylic polymer, an acryl-silicone polymer, and a styrene-butadiene polymer. Among them, polymers selected from urethane, acrylic, styrene-acrylic, and styrene-butadiene polymers are preferred.

The polymer is available commercially in the form of an emulsion. Examples of the commercially available polymer emulsion include Superflex 420, 470, and 890 (urethane resin emulsions, all manufactured by DKS Co. Ltd.); Hydran HW-350, HW-178, HW-163, HW-171, AP-20, AP-30, WLS-201, and WLS-210 (urethane resin emulsions, all manufactured by DIC Corporation); 0569, 0850Z, and 2108 (styrene-butadiene resin emulsions, all manufactured by JSR Corporation); AE980, AE981A, AE982, AE986B, and AE104 (acrylic resin emulsions, all manufactured by Emulsion Technology Co., Ltd.); NeoCryl A-1105, A-1125, and A-1127 (acrylic resin emulsions, all manufactured by DSM Coating Resins Ltd.); and NeoCryl A-655 (styrene-acrylic resin emulsion, manufactured by DSM Coating Resins Ltd.).

The wax available can be a natural wax or a synthetic wax.

Examples of the natural wax include a petroleum wax such as paraffin wax and microcrystalline wax; a lignite wax such as montane wax; a vegetable wax such as carnauba wax and candelilla wax; and an animal and plant wax such as beeswax and lanolin.

Examples of the synthetic wax include a polyalkylene wax (preferably, a poly-C2-C4 alkylene wax), an oxidized polyalkylene wax (preferably, an oxidized poly-C2-C4 alkylene wax), and a paraffin wax. Among them, a polyethylene wax, a polypropylene wax, an oxidized polyethylene wax, an oxidized polypropylene wax, and a paraffin wax are preferred.

The average particle size of the wax is preferably 50 nm to 5 μm, and more preferably 100 nm to 1 μm in order to prevent clogging of an inkjet head.

The wax is available commercially in the form of an emulsion. Examples of the commercially available wax emulsion include CERAFLOUR 925, 929, 950, and 991, AQUACER 498, 515, 526, 531, 537, 539, 552, and 1547, and AQUAMAT 208, 263, and 272; MINERPOL 221 (all manufactured by BYK); Mitsui Hi-WAX NL100, NL200, NL500, 4202E, 1105A, 2203A, NP550, NP055, and NP505 (all manufactured by Mitsui Chemicals, Inc.); KUE-100 and 11 (all manufactured by Sanyo Chemical Industrial, Co., Ltd.); and HYTEC P-5300, E-6500, 9015, and 6400 (all manufactured by Toho Chemical Industry, Co., Ltd.).

When the ink according to the present embodiment contains a fixing resin, the content thereof with respect to the total mass of the ink according to the present embodiment is preferably 1 to 20% by mass and more preferably 3 to 15% by mass. When the content of the fixing resin is 1% by mass or more, the ink tends to exhibit good fixing properties to a printing medium. When the content of the fixing resin is 20% by mass or less, the ink tends to have good discharge properties and storage stability.

[Organic Solvent]

The ink according to the present embodiment may contain an organic solvent. Examples of the organic solvent include C1-C6 alkanol such as methanol, ethanol, propanol, isopropanol, butanol, isobutanol, 3-methoxy butanol, 3-methoxy-3-methyl-1-butanol, secondary butanol, and tertiary butanol; carboxylic acid amide such as N, N-dimethylformamide and N, N-dimethylacetamide; lactam such as 2-pyrrolidone, N-methyl-2-pyrrolidone, and N-methylpyrrolidin-2-one; cyclic urea such as 1,3-dimethylimidazolidin-2-one and 1,3-dimethyl hexahydropyrimid-2-one; ketone, keto-alcohol, or carbonate such as acetone, 2-methyl-2-hydroxypentan-4-one, and ethylene carbonate; cyclic ether such as tetrahydrofuran and dioxane; mono-, oligo-, or polyalkylene glycol or thioglycol having a C2-C6 alkylene unit such as ethylene glycol, diethylene glycol, 1,2-propylene glycol, 1,3-propylene glycol, 1,2-butylene glycol, 1,4-butylene glycol, diethylene glycol, triethylene glycol, tetraethylene glycol, dipropylene glycol, polyethylene glycol (preferably with a molecular weight of 400, 800, 1540, or more), polypropylene glycol, thiodiglycol, and dithiodiglycol; C3-C9 polyol (triol) such as glycerol, diglycerol, hexane-1,2,6-triol, and trimethylolpropane; glycol ether (preferably, C4-C10 mono- or diethylene glycol ether or C4-C13 mono-, di-, or tripropylene glycol ether), such as ethylene glycol monomethyl ether, ethylene glycol monoethyl ether, ethylene glycol monoallyl ether, ethylene glycol monoisopropyl ether, ethylene glycol monophenyl ether, ethylene glycol monobenzyl ether, diethylene glycol monomethyl ether, diethylene glycol monoethyl ether, diethylene glycol monobutyl ether (butyl carbitol), diethylene glycol monophenyl ether, diethylene glycol monobenzyl ether, triethylene glycol monomethyl ether, triethylene glycol monoethyl ether, triethylene glycol monobutyl ether, propylene glycol monopropyl ether, propylene glycol monobutyl ether, dipropylene glycol monopropyl ether, dipropylene glycol monobutyl ether, and dipropylene glycol monomethyl ether; C3-C9 alkanediol such as 2-ethyl-2-butyl-1.3-propanediol, 1,2-pentanediol, 1,5-pentanediol, 1,2-hexanediol, 1,6-hexanediol, 2-methyl-2,4-pentanediol, 2-ethyl-1,3-hexanediol, 2,4-diethyl-1,5-pentanediol, 1,2-heptanediol, 1,7-heptanediol, 1,2-octanediol, 1,8-octanediol, and 1,9-nonanediol; Y-butyrolactone; and dimethyl sulfoxide. Among these, 3-methoxy butanol, 3-methoxy-3-methyl-1-butanol, and 1,5-pentanediol are preferred, and 1,2-pentanediol is more preferred.

When the ink according to the present embodiment contains the organic solvent, the content thereof with respect to the total mass of the ink according to the present embodiment is preferably 1 to 10% by mass, more preferably 1 to 7% by mass, and even more preferably 2 to 4% by mass.

[Other Components]

The ink according to the present embodiment may contain an ink preparation agent such as a fungicide, a preservative, a pH adjuster, a chelating reagent, a rust inhibitor, a defoamer, a water-soluble ultraviolet absorber, and an antioxidant, if necessary. The contained amount of each ink preparation agent can be arbitrarily set according to the application of the ink and the like.

(Fungicide)

Examples of the fungicide include sodium dehydroacetate, sodium benzoate, sodium pyridinethion-1-oxide, p-hydroxybenzoic acid ethyl ester, and 1,2-benzisothiazolin-3-one and a salt thereof.

(Preservative)

Examples of the preservative include an organic sulfur compound, an organic nitrogen sulfur compound, an organic halogen compound, a haloarylsulfone compound, an iodopropargyl compound, a haloalkylthio compound, a nitrile compound, a pyridine compound, an 8-oxyquinoline compound, a benzothiazole compound, an isothiazoline compound, a dithiol compound, a pyridine oxide compound, a nitropropane compound, an organotin compound, a phenol compound, a quaternary ammonium salt compound, a triazine compound, a thiazine compound, an anilide compound, an adamantane compound, a dithiocarbamate compound, a brominated indanone compound, a benzyl bromoacetate compound, and an inorganic salt compound. Specific examples of the organic halogen compound include sodium pentachlorophenol. Specific examples of the pyridine oxide compound include sodium 2-pyridinethiol-1-oxide. Specific examples of the isothiazoline compound include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Specific examples of the other preservative and fungicide include anhydrous sodium acetate, sodium sorbate, sodium benzoate, and trade names Proxel GXL (S), Proxel LV, and Proxel XL-2 (S), manufactured by Arch Chemicals Inc.

(pH Adjuster)

Examples of the pH adjuster include alkanolamine such as diethanolamine, triethanolamine, and N-methyldiethanolamine; a hydroxide of an alkali metal such as lithium hydroxide, sodium hydroxide, and potassium hydroxide; ammonium hydroxide (aqueous ammonia); a carbonate of an alkali metal such as lithium carbonate, sodium carbonate, sodium bicarbonate, and potassium carbonate; an alkali metal salt of an organic acid such as sodium silicate and potassium acetate; and an inorganic base such as disodium phosphate.

(Chelating Reagent)

Examples of the chelating reagent include disodium ethylenediaminetetraacetate, sodium nitrilotriacetate, sodium hydroxyethylethylenediaminetriacetate, sodium diethylenetriaminepentaacetate, and sodium uracil diacetate.

(Rust Inhibitor)

Examples of the rust inhibitor include acid sulfite, sodium thiosulfate, ammonium thioglycolate, diisopropylammonium nitrite, pentaerythritol tetranitrate, and dicyclohexylammonium nitrite.

(Defoamer)

Examples of the defoamer include a silicone compound, a silica mineral oil compound, an olefin compound, and an acetylene compound. Examples of the commercially available defoamer include Surfynol DF37, DF58, DF110D, DE220, and MD-20, and Olfine SK-14, manufactured by Shin-Etsu Chemical Co., Ltd.

(Water-Soluble Ultraviolet Absorber)

Examples of the water-soluble ultraviolet absorber include a sulfonated benzophenone compound, a benzotriazol compound, a salicylic acid compound, a cinnamic acid compound, and a triazine compound.

(Antioxidant)

The antioxidant available can be various organic and metal complex antifading agents. Examples of the organic antifading agents include hydroquinones, alkoxyphenols, dialkoxyphenols, phenols, anilines, amines, indanes, chromanes, alkoxyanilines, and heterocycles.

[Ink Preparation Method and Other Methods]

The method of preparing the ink according to the present embodiment is not particularly limited, and any known preparation method can be employed. One example thereof is a method of preparing a dispersion liquid containing a coloring material and a dispersant, adding water, a first surfactant, a second surfactant, a fixing resin, an organic solvent, and if necessary, an ink preparation agent, to this dispersion liquid, and mixing it.

Examples of the method of preparing the dispersion liquid include a phase inversion emulsification method, an acid precipitation method, an interfacial polymerization method, an in-situ polymerization method, a submerged curing coating method, a coacervation (phase separation) method, a submerged drying method, a melt-dispersion cooling method, an in-air suspension coating method, and a spray drying method. Among them, the phase inversion emulsification method, the acid precipitation method, and the interfacial polymerization method are preferred, and the phase inversion emulsification method is more preferred.

When the dispersion liquid is prepared by the phase inversion emulsification method, for example, the dispersant is dissolved in an organic solvent such as 2-butanone, and an aqueous solution of a neutralizer is added to prepare an emulsified liquid. A coloring material is added to the resulting emulsified liquid for dispersion treatment. From the liquid thus obtained, the organic solvent and part of the water are distilled under reduced pressure, thereby obtaining the desired dispersion liquid.

The dispersion treatment can be carried out using a sand mill (bead mill), a roll mill, a ball mill, a paint shaker, an ultrasonic disperser, a microfluidizer, or the like. For example, when the sand mill is used, the dispersion treatment can be performed by using beads with a particle size of about 0.01 to 1 mm and by appropriately setting the packing ratio of the beads. By performing operations such as filtration and centrifugation on the dispersion liquid obtained as described above, the particle sizes of the particles contained in the dispersion liquid can be made uniform. When foaming occurs during the preparation of the dispersion liquid, a known silicone or acetylene glycol defoamer can be added in an extremely small amount.

The ink according to the present embodiment preferably has a low content of inorganic impurities such as chloride of metal cations (e.g., sodium chloride) and metal sulfate (e.g., sodium sulfate). Such inorganic impurities are often present in a commercially available coloring material. The standard content of the inorganic impurities is approximately 1% by mass or less with respect to the total mass of the coloring material, and the lower limit is below the detection limit of the analyzer, i.e., 0% by mass is ideal. Examples of the method of obtaining a coloring material with few inorganic impurities include: a method using a reverse osmosis membrane; a method of suspending and stirring a solid coloring material in a mixed solvent of C1-C4 alcohol such as methanol and water and separating the coloring material through filtration, followed by drying; and a method of exchanging and adsorbing inorganic impurities with an ion exchange resin.

The ink according to the present embodiment is preferably microfiltered in advance. A membrane filter, glass filter paper, or the like can be used for microfiltration. The pore size of the filter or the like when performing microfiltration is usually 0.5 to 20 μm, preferably 0.5 to 10 μm.

The ink according to the present embodiment is also excellent in storage stability, redispersibility, color development, and chroma. A printed image recorded using the ink according to the present embodiment is also excellent in various fastnesses, such as water resistance, light resistance, heat resistance, and oxidation gas resistance (e.g., ozone gas resistance). Moreover, the ink according to the present embodiment leaves less coating unevenness during image formation and has excellent image formability as well as recoatability in a post-processing step.

<Ink Set and Ink and Medium Set>

The ink set according to the present embodiment includes the above-described ink according to the present embodiment and an additional ink different from the ink. The additional ink is not particularly limited as long as it has a configuration different from that of the ink according to the present embodiment but preferably has a hue different from that of the ink according to the present embodiment.

In addition, the ink and medium set according to the present embodiment includes the above-described ink or ink set according to the present embodiment and a printing medium.

The printing medium is not particularly limited but preferably a less ink-absorbent or non-ink-absorbent printing medium, and more preferably a non-ink-absorbent printing medium. Examples of the less ink-absorbent printing medium include plain paper without an ink-receiving layer, a medium used in rotogravure or offset printing, art paper, coated paper, matte paper, and cast paper. Further, examples of the non-ink-absorbent printing medium include a polyethylene terephthalate (PET) film, a polypropylene (PP) film, a vinyl chloride sheet, glass, and rubber.

<Inkjet Printing Method>

The inkjet printing method according to the present embodiment is a method of performing printing by discharging droplets of the above-described ink according to the present embodiment in response to a printing signal and adhering the droplets to a printing medium. The ink nozzle and the like of the inkjet printer that discharges ink are not particularly limited and can be appropriately selected according to the purpose.

The inkjet printing method according to the present embodiment also includes a method of improving resolution of an image by ejecting a large number of inks with a low content of coloring materials in the inks in a small volume; a method of improving resolution of an image by using a plurality of inks having substantially the same hue but different contents of coloring materials in the inks; and a method of improving fixing properties of a coloring material to a printing medium by using a colorless transparent ink together with an ink containing the coloring material.

As the inkjet printing method, a known method can be employed. Examples thereof include a charge control method, a drop-on-demand method (also referred to as a pressure pulse method), an acoustic inkjet method, and a thermal inkjet method. Furthermore, the inkjet printing method may be either a multi-pass method or a single-pass method (one pass printing method). In an industrial inkjet printer, single-pass printing using a line-head type inkjet printer is also preferably performed for the purpose of increasing the printing speed. With the ink according to the present embodiment, it is possible to produce a printed image with excellent resolution of the image and recoatability even under such printing conditions.

When printing on a printing medium, for example, a container (ink tank) containing an ink is loaded into a predetermined position of an inkjet printer, and printing is performed on the printing medium by the printing method described above. Full-color printing can also be achieved by loading a container containing each color ink into a predetermined position of an inkjet printer and printing on a printing medium by the printing method described above.

When a printing medium without an ink-receiving layer is used, surface modification treatment is also preferably performed on the printing medium to improve fixing properties or the like of a coloring material. Examples of the surface modification treatment include corona discharge treatment, plasma treatment, and flame treatment. It is generally known that the effect of the surface modification treatment decreases over time. Therefore, it is preferable to sequentially perform the surface modification treatment step and the inkjet printing step, and it is more preferable to perform the surface modification treatment step right before the inkjet printing step.

For all of the above, combinations of preferred ones are more preferred, and combinations of more preferred ones are even more preferred. The same is true for combinations of preferred and more preferred, combinations of more preferred and even more preferred, and the like.

EXAMPLES

Hereinafter, the present invention will be described in more detail with reference to Examples, but the present invention is not limited thereto.

In Examples, "part" and "%" mean part by mass and % by mass, respectively, unless otherwise specified. When it was necessary to quantify pigment solids in a dispersion liquid, a dry weight method was employed with MS-70 manufactured by A&D Company, Limited. The pigment solids are conversion values obtained by calculating only the pigment solids from the total amount of the solid content.

Preparation Example 1: Preparation of Pigment Dispersion Liquid Dp1

Synthesis Example 3 in International Publication No. WO 2013/115071 was replicated to obtain a block copolymer. The obtained block copolymer had an acid value of 105 mg KOH/g and a mass average molecular weight of 25000. The obtained block copolymer (6 parts) was dissolved in 2-butanone (30 parts) to form a homogeneous solution. A 28% aqueous ammonia solution (0.68 parts) dissolved in ion-exchanged water (53 parts) was added to this liquid, and the mixture was stirred for an hour to obtain an emulsified liquid. C.I. Pigment Blue 15:4 (Chromofine Blue 4851, manufactured by Dainichiseika Color & Chemicals Mfg. Co., Ltd.) (20 parts) was added to the emulsified liquid, and the mixture was subjected to a dispersion treatment in a sand grinder under a condition of 1500 rpm for 15 hours. Ion-exchanged water (100 parts) was added dropwise to the resulting liquid, and dispersing beads were removed from the mixture by filtration. Then, 2-butanone and part of the water were distilled under reduced pressure with an evaporator to obtain a pigment dispersion liquid with 12% pigment solids. The obtained pigment dispersion liquid was referred to as “Dp1”.

Preparation Example 2: Preparation of Pigment Dispersion Liquid Dp2

BYKJET 9151 (manufactured by BYK) (8 parts) was dissolved in ion-exchanged water (72 parts) and stirred for an hour. C.I. Pigment Blue 15:4 (Chromofine Blue 4851, manufactured by Dainichiseika Color & Chemicals Mfg. Co., Ltd.) (20 parts) was added to the resulting solution, and the mixture was subjected to a dispersion treatment in a sand grinder under a condition of 1500 rpm for 15 hours. Ion-exchanged water (70 parts) was added dropwise to the resulting liquid, and dispersing beads were removed from the mixture by filtration to obtain a pigment dispersion liquid with 11.6% pigment solids. The obtained pigment dispersion liquid was referred to as “Dp2”.

Preparation Example 3: Preparation of Pigment Dispersion Liquid Dp3

Joncryl 68 (manufactured by BASF SE, mass average molecular weight: 13000) (9 parts) and triethanolamine (6 parts) were dissolved in ion-exchanged water (75 parts) and stirred for an hour. C.I. Pigment Blue 15:4 (Chromofine Blue 4851, manufactured by Dainichiseika Color & Chemicals Mfg. Co., Ltd.) (30 parts) was added to the resulting solution, and the mixture was subjected to a dispersion treatment in a sand grinder under a condition of 1500 rpm for 15 hours. Ion-exchanged water (40 parts) was added dropwise to the resulting liquid, and dispersing beads were removed from the mixture by filtration to obtain a pigment dispersion liquid with 18.7% pigment solids. The obtained pigment dispersion liquid was referred to as “Dp3”.

Examples 1 to 13 and Comparative Examples 1 to 4

Components listed in Tables 1 to 3 below were mixed together and then filtered through a membrane filter having a pore size of 3 μm to obtain inks of Examples 1 to 13 and Comparative Examples 1 to 4. The content of the pigment in the total mass of the ink was adjusted to 5% in each case.

The numerical values in the columns of each component in Tables 1 to 3 represent the amount (parts) of the component used, and “-” means that the component was not used.

Each abbreviation or the like in Tables 1 to 3 below is as follows.

Dp1: pigment dispersion liquid obtained in Preparation Example 1

Dp2: pigment dispersion liquid obtained in Preparation Example 2

CABOJET: CAB-O-JET 400 (self-dispersing black pigment liquid, manufactured by Cabot Corporation, pigment solids: 15.1%)

Dp3: pigment dispersion liquid obtained in Preparation Example 3

BN-3: BLAUNON BN-3 (nonionic surfactant, manufactured by AOKI OIL INDUSTRIAL Co., Ltd.)

WE3323: Hydropalat WE3323 (nonionic surfactant, manufactured by BASF SE)

EC8600: ADEKA COL EC-8600 (anionic surfactant, manufactured by ADEKA Corporation)

XP40: Lutensol XP40 (nonionic surfactant, manufactured by BASF SE)

SF420: SURFYNOL 420 (nonionic surfactant, manufactured by Nissin Chemical Industry Co., Ltd.)

SF440: SURFYNOL 440 (nonionic surfactant, manufactured by Nissin Chemical Industry Co., Ltd.)

SH30: SOFTANOL 30 (nonionic surfactant, manufactured by Nippon Shokubai Co., Ltd.)

SH50: SOFTANOL 50 (nonionic surfactant, manufactured by Nippon Shokubai Co., Ltd.)

A-1127: NeoCryl A-1127 (acrylic resin emulsion, manufactured by DSM Coating Resins Ltd.)

A-655: NeoCryl A-655 (styrene-acrylic resin emulsion, manufactured by DSM Coating Resins Ltd.)

WBR-2101: ACRIT WBR-2101 (urethane resin emulsion, manufactured by Taisei Fine Chemical Co., Ltd.)

AQ-515: AQUACER 515 (polyethylene wax emulsion, manufactured by BYK)

P5300: HYTEC P-5300 (polypropylene wax emulsion, manufactured by Toho Chemical Industry, Co., Ltd)

12PD: 1,2-pentanediol (manufactured by Tokyo Chemical Industry Co., Ltd.)

TABLE 1

| Component | | Solid content (%) | Example 1 | 2 | 3 | 4 | 5 | 6 | 7 |
|---|---|---|---|---|---|---|---|---|---|
| Coloring material | Dp1 | 12 | 41.7 | 41.7 | 41.7 | 41.7 | 41.7 | 41.7 | 41.7 |
| | Dp2 | 11.6 | — | — | — | — | — | — | — |
| | CABOJET | 15.1 | — | — | — | — | — | — | — |
| | Dp3 | 18.7 | — | — | — | — | — | — | — |
| First | BN-3 | 100 | 0.5 | 0.5 | 0.5 | 0.5 | 0.5 | — | 0.5 |

TABLE 1-continued

| Component | | Solid content (%) | Example 1 | 2 | 3 | 4 | 5 | 6 | 7 |
|---|---|---|---|---|---|---|---|---|---|
| surfactant | WE3323 | 100 | — | — | — | — | — | 0.4 | — |
| | EC8600 | 72 | 0.4 | 0.4 | 0.4 | 0.4 | — | 0.4 | 0.4 |
| Second surfactant | XP40 | 100 | 1.0 | — | — | — | — | 1.0 | 1.0 |
| | SF420 | 100 | — | 1.0 | — | — | — | — | — |
| | SF440 | 100 | — | — | 1.0 | — | — | — | — |
| | SH30 | 100 | — | — | — | 1.0 | — | — | — |
| | SH50 | 100 | — | — | — | — | 1.0 | — | — |
| Silicone surfactant | BYK-349 | 100 | — | — | — | — | — | — | — |
| | BYK-3450 | 100 | — | — | — | — | — | — | — |
| Fixing resin | A-1127 | 44 | 11.4 | 11.4 | 11.4 | 11.4 | 11.4 | 11.4 | — |
| | A-655 | 45 | — | — | — | — | — | — | 11.1 |
| | WBR-2101 | 24 | — | — | — | — | — | — | — |
| | AQ-515 | 35 | — | — | — | — | — | — | — |
| | P5300 | 30.5 | — | — | — | — | — | — | — |
| Organic solvent | 12PD | — | 3.0 | 3.0 | 3.0 | 3.0 | 3.0 | 3.0 | 3.0 |
| Purified water | | | 42.1 | 42.1 | 42.1 | 42.1 | 42.5 | 42.2 | 42.3 |
| Total | | | 100.0 | 100.0 | 100.0 | 100.0 | 100.0 | 100.0 | 100.0 |

TABLE 2

| Component | | Solid content (%) | Example 8 | 9 | 10 | 11 | 12 | 13 |
|---|---|---|---|---|---|---|---|---|
| Coloring material | Dp1 | 12 | 41.7 | 41.7 | — | — | — | — |
| | Dp2 | 11.6 | — | — | 30.2 | — | — | — |
| | CABOJET | 15.1 | — | — | — | 23.2 | — | — |
| | Dp3 | 18.7 | — | — | — | — | 18.7 | 18.7 |
| First surfactant | BN-3 | 100 | 0.5 | 0.5 | 0.5 | 0.5 | 0.5 | 0.5 |
| | WE3323 | 100 | — | — | — | — | — | — |
| | EC8600 | 72 | 0.4 | — | 0.4 | 0.4 | 0.4 | 0.4 |
| Second surfactant | XP40 | 100 | 1.0 | 1.0 | 1.0 | 1.0 | 1.0 | 1.0 |
| | SF420 | 100 | — | — | — | — | — | — |
| | SF440 | 100 | — | — | — | — | — | — |
| | SH30 | 100 | — | — | — | — | — | — |
| | SH50 | 100 | — | — | — | — | — | — |
| Silicone surfactant | BYK-349 | 100 | — | — | — | — | — | — |
| | BYK-3450 | 100 | — | — | — | — | — | — |
| Fixing resin | A-1127 | 44 | — | — | 11.4 | 11.4 | 11.4 | — |
| | A-655 | 45 | — | — | — | — | — | — |
| | WBR-2101 | 24 | 20.8 | — | — | — | — | — |
| | AQ-515 | 35 | — | 14.4 | — | — | — | — |
| | P5300 | 30.5 | — | — | — | — | — | 16.4 |
| Organic solvent | 12PD | — | 3.0 | 3.0 | 3.0 | 3.0 | 3.0 | 3.0 |
| Purified water | | | 32.6 | 39.5 | 53.5 | 60.5 | 65.0 | 60.0 |
| Total | | | 100.0 | 100.0 | 100.0 | 100.0 | 100.0 | 100.0 |

TABLE 3

| Component | | Solid content (%) | Comparative Example 1 | 2 | 3 | 4 |
|---|---|---|---|---|---|---|
| Coloring material | Dp1 | 12 | 41.7 | 41.7 | 41.7 | 41.7 |
| | Dp2 | 11.6 | — | — | — | — |
| | CABOJET | 15.1 | — | — | — | — |
| | Dp3 | 18.7 | — | — | — | — |
| First surfactant | BN-3 | 100 | 0.5 | 0.5 | — | 0.5 |
| | WE3323 | 100 | — | — | — | — |
| | EC8600 | 72 | 0.4 | 0.4 | — | — |
| Second surfactant | XP40 | 100 | — | — | 1.0 | — |
| | SF420 | 100 | — | — | — | — |

TABLE 3-continued

| Component | | Solid content (%) | Comparative Example 1 | 2 | 3 | 4 |
|---|---|---|---|---|---|---|
| | SF440 | 100 | — | — | — | — |
| | SH30 | 100 | — | — | — | — |
| | SH50 | 100 | — | — | — | — |
| Silicone surfactant | BYK-349 | 100 | 0.5 | — | — | — |
| | BYK-3450 | 100 | — | 0.5 | — | — |
| Fixing resin | A-1127 | 44 | 11.4 | 11.4 | 11.4 | 11.4 |
| | A-655 | 45 | — | — | — | — |
| | WBR-2101 | 24 | — | — | — | — |

TABLE 3-continued

| Component | | Solid content (%) | Comparative Example 1 | 2 | 3 | 4 |
|---|---|---|---|---|---|---|
| | AQ-515 | 35 | — | — | — | — |
| | P5300 | 30.5 | — | — | — | — |
| Organic solvent | 12PD | — | 3.0 | 3.0 | 3.0 | 3.0 |
| | Purified water | | 42.6 | 42.6 | 43.0 | 43.5 |
| | Total | | 100.0 | 100.0 | 100.0 | 100.0 |

<Evaluation>

[Coatability Test]

The inks of Examples and Comparative Examples were each applied over the entire surface of a PET film (E5100, manufactured by Toyobo Co., Ltd.) using a bar coater No. 3 in an automatic coating machine (PI-1210, manufactured by Tester Sangyo Co., Ltd.). Thereafter, each film was dried in a thermostatic bath at 70° C. for 2 minutes to obtain a test print. The obtained test print was visually observed to evaluate coating unevenness according to evaluation criteria below. The results are shown in Table 4 below. An A or B rating indicates good coatability. The term "outer side" below refers to a region of the printed surface that is within 5 mm from the outer edge of the print, and the term "inner side" below refers to the printed surface excluding the outer portion of the test print.

—Evaluation Criteria—

A: The coating was uniform without unevenness.

B: Color unevenness appeared on the outer side of the coated surface.

C: Color unevenness appeared on the inner side of the coated surface.

D: Color unevenness appeared on the inner and outer sides of the coated surface.

[Recoatability Test]

The recoatability was evaluated by measuring a contact angle of the printed surface of the test print. DM-501 Hi (manufactured by Kyowa Interface Science Co., Ltd.) was used as an automatic contact angle meter to measure the contact angle. After 2.0 μL of a test liquid for measuring the contact angle (wetting tension test mixture 30.0 mN/m, manufactured by Kanto Chemical Co., Inc.) was formed in a pendant shape at the tip of a nozzle, the nozzle was slowly lowered to drop the liquid onto the printed surface. The droplet immediately after dropping was captured as a continuous image, and then the contact angle was calculated by analyzing the droplet diameter and droplet height of the droplet 1 second after dropping to evaluate recoatability according to evaluation criteria below. The results are shown in Table 4 below. Since a lower numerical value of the contact angle means that the test liquid wets and spreads well on the printed surface, the following evaluation criteria are preferably B or higher for practical use. The ink of Comparative Example 3 was not tested for recoatability because it was difficult to measure the contact angle due to color unevenness observed on the entire coated surface.

—Evaluation Criteria—

A: 21°>contact angle

B: 21°≤contact angle<23°

C: 23°≤contact angle<25°

D: 25°≤contact angle

TABLE 4

| | Example 1 | 2 | 3 | 4 | 5 | 6 | 7 | 8 | 9 | 10 | 11 | 12 | 13 | Comparative Example 1 | 2 | 3 | 4 |
|---|---|---|---|---|---|---|---|---|---|---|---|---|---|---|---|---|---|
| Coatability | A | A | A | A | B | A | A | A | B | A | A | A | A | A | A | D | B |
| Recoatability | A | A | A | A | A | A | A | A | A | A | A | A | A | D | D | — | C |

As shown in Table 2, the inks of Examples 1 to 13 were superior to the inks of Comparative Examples 1 to 4 in terms of recoatability. The inks of Examples 1 to 4 and 6 to 13 had the same or better coatability as/than the inks of Comparative Examples 1 to 4, while the inks of Examples 5 and 9 had the same or better coatability as/than the inks of Comparative Examples 3 and 4. The results indicate that the inks of Examples 1 to 13 are excellent inks having both wettability to and recoatability on a non-ink-absorbent medium.

The invention claimed is:

1. A recording ink comprising a coloring material, a first surfactant, a second surfactant, and water, wherein:

the first surfactant comprises at least one compound selected from the group consisting of a compound represented by formula (a) below, a compound represented by formula (b) below, and a compound represented by formula (c) below, provided that when the first surfactant comprises the compound represented by formula (c) below, the first surfactant further comprises at least one compound selected from the compound represented by formula (a) below and the compound represented by formula (b) below; and the second surfactant comprises at least one compound selected from a compound represented by formula (d) below and a compound represented by general formula (e) below:

(a)

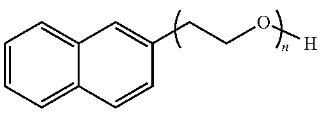

(b)

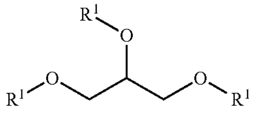

-continued (c)

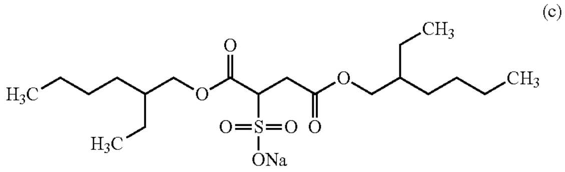

(d)

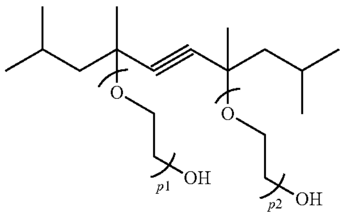

(e)

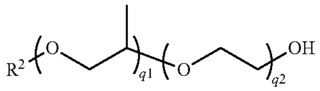

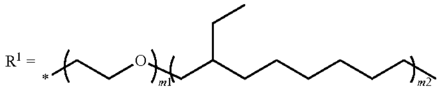

wherein, in formula (a), n represents an integer of 3 to 25, in formula (b), m1 represents an integer of 1 to 4, and m2 represents an integer of 1 to 3, * in $R^1$ represents a position of bonding to an oxygen atom in formula (b), in formula (d), p1 represents an integer of 0 to 4, p2 represents an integer of 0 to 4, and a sum of p1 and p2 is 1 to 4, and in formula (e), q1 represents an integer of 0 to 4, q2 represents an integer of 1 to 5, and $R^2$ represents a linear or branched C10-C13 hydrocarbon group.

2. The recording ink according to claim 1, wherein the second surfactant comprises a compound having an ethyleneoxy group in an amount of 1 to 5 molar equivalents and a propyleneoxy group in an amount of 0 to 3 molar equivalents per mole of molecules.

3. The recording ink according to claim 1, wherein the coloring material is a pigment, and a content thereof is 1 to 10% by mass.

4. The recording ink according claim 1, wherein a content of the water is 80% by mass or more.

5. An ink set comprising: the recording ink according to claim 1; and an additional recording ink different from the recording ink.

6. An ink and medium set comprising: the recording ink according to claim 1 and a printing medium.

7. A printed medium to which the recording ink according to claim 1 adheres.

* * * * *